No. 611,836. Patented Oct. 4, 1898.
J. CUNNINGHAM.
COLLAPSIBLE CRATE.
(Application filed Sept. 25, 1897.)
(No Model.)
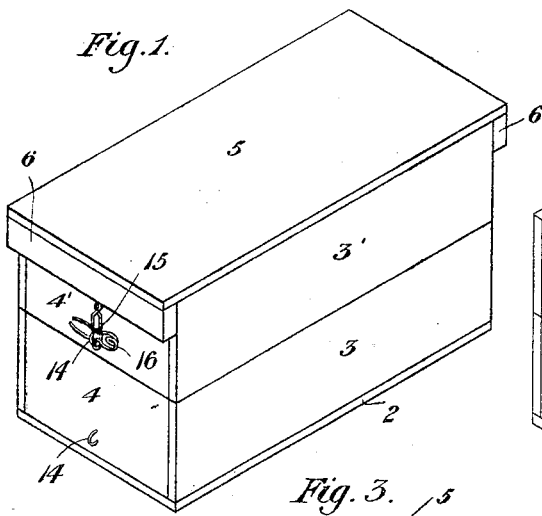
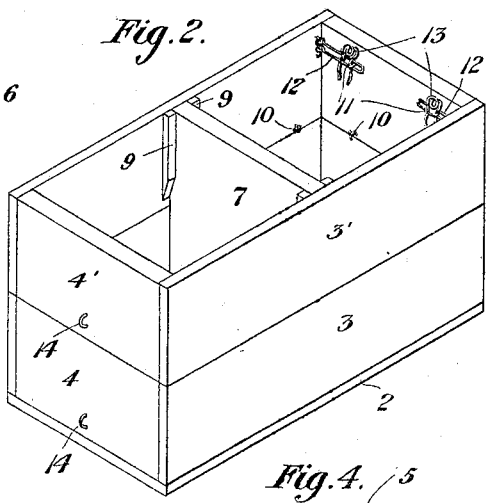
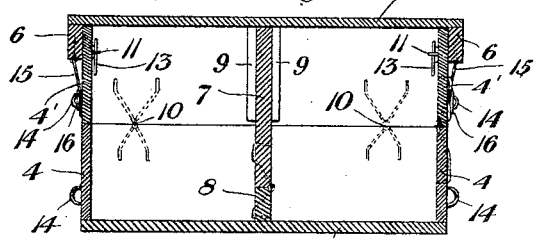
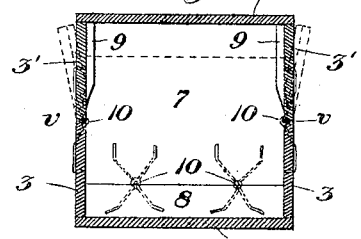
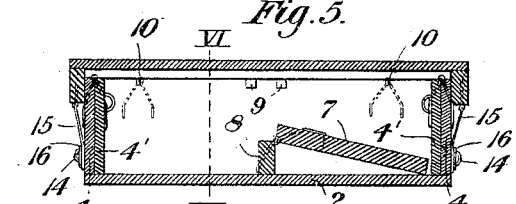
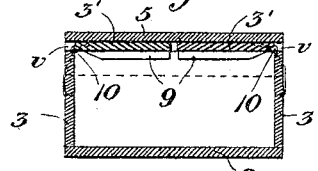
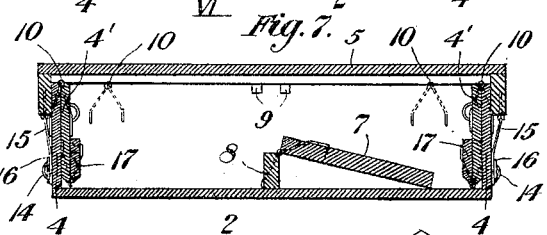
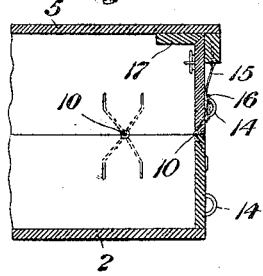
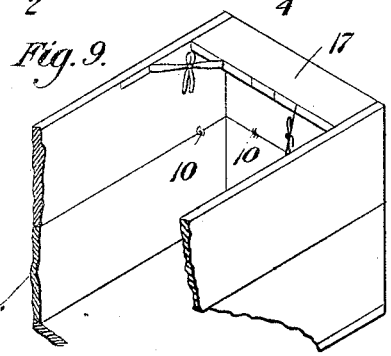
Witnesses:
Geo. B. Parker.
Watson Large.
Inventor:
John Cunningham.
by O. M. Clarke
his attorney.
THE NORRIS PETERS CO., PHOTO-LITHO., WASHINGTON, D. C.

UNITED STATES PATENT OFFICE.

JOHN CUNNINGHAM, OF PITTSBURG, PENNSYLVANIA, ASSIGNOR OF ONE-HALF TO JOHN CARNEY, OF SAME PLACE.

COLLAPSIBLE CRATE.

SPECIFICATION forming part of Letters Patent No. 611,836, dated October 4, 1898.

Application filed September 25, 1897. Serial No. 653,077. (No model.)

*To all whom it may concern:*

Be it known that I, JOHN CUNNINGHAM, a citizen of the United States, residing at Pittsburg, in the county of Allegheny and State of Pennsylvania, have invented or discovered a new and useful Improvement in Collapsible Crates, of which the following is a full, clear, and exact description, reference being had to the accompanying drawings, forming part of this specification, in which—

Figure 1 is a perspective view of a crate complete. Fig. 2 is a similar view showing the lid removed. Fig. 3 is a longitudinal vertical section taken through the center of Fig. 1. Fig. 4 is a similar cross-sectional view. Fig. 5 is a view similar to Fig. 3, but showing the crate collapsed. Fig. 6 is a cross-section through Fig. 5 on the line VI VI. Fig. 7 is a view similar to Fig. 5, showing brace-boards attached to the ends. Fig. 8 is a partial longitudinal section showing the brace-board in position. Fig. 9 is a perspective view illustrating the brace-board.

My invention consists of a folding crate, and is designed for the purpose of compactly packing such crates into suitable shape as will permit of their shipment in bulk when in a collapsed condition, so as to occupy the smallest possible space.

Referring to the drawings, 2 is the bottom of the crate, to which are permanently secured the sides 3 and ends 4, the sides extending over the ends. About midway of the crate the sides and ends are divided and the upper portion 3' 4' is hinged so as to fold inwardly, the ends being adapted to fold down between the sides, as shown in Fig. 5, and the sides to lie over flat, resting on the ends, as clearly shown in Fig. 6. The top 5 is made flush with the sides and at each end is provided with the downwardly-extending ends 6, which serve to retain the top and ends in position. Midway of the crate is a partition 7, hinged to a narrow cross-bottom partition 8, and the hinged partition is of a height to allow it to be folded down inside the crate, as clearly shown in Fig. 5.

For the purpose of retaining the partition in position when erected the inside faces of the sides are provided with cleats 9 9, adapted to engage each edge of the partition, and for the purpose of permitting the partition to be swung freely up into position the meeting edges of the sides 3 and 3' are beveled outwardly slightly at $v$, thereby allowing the upper sides 3' to be bent back to the position indicated in dotted lines in Fig. 4, whereby the cleats are removed beyond the edge of the partition, and the cleats 9 are beveled at the inner bottom ends to permit passage of the partition. I have shown hinges constructed of wire provided with engaging eyes at 10, the body of the wire being laced through the wood of the crate, as indicated, although any other form of hinge may be employed to good advantage, and I do not desire to be limited to such construction.

For the purpose of securely holding the crate together I have provided in the ends staples 11, and to the sides are secured swinging hasps 12, adapted to embrace the staples, the parts being secured together by a spring-pin 13, inserted in the staple after the hasp is in position, as shown in Fig. 2.

The ends of the crate are provided with similar staples 14 on the outside, both on the permanent and hinged end portions, and a hasp 15 is secured to the lower edge of the ends 6, adapted to embrace the staples in both positions of the crate set up and collapsed, as shown in Figs. 3 and 5 of the drawings, the hasp being secured in position by a spring-pin 16.

In Figs. 7, 8, and 9 I have shown an additional extension 17, hinged to the top of the upper ends 4', the parts being beveled at the meeting face, and the extension 17 is adapted to fold in between the sides and act as a brace for the same, being secured in position by tapes, as shown, or by additional hasps and staples.

When collapsed, the crate occupies a much reduced space, thereby facilitating return shipment in an economical manner.

The crate is adapted for use in a great variety of ways and may be modified in construction without departing from my invention to suit it to varying conditions of use.

What I claim is—

1. In a folding crate, the combination of a permanent bottom, ends and sides; a divided hinged partition adapted to stand vertically and to be folded downwardly within the crate, folding sides hinged to the permanent sides provided with cleats adapted to engage the partition, beveled at the inner lower ends, the permanent and folding sides being beveled at their meeting edges to permit the hinged sides to be extended outwardly for passage of the partition, folding ends hinged to the permanent ends adapted to be turned inwardly, and supplemental extensions hinged to the folding ends with beveled meeting faces, adapted to extend horizontally inward between the sides when the crate is erected, and means for securing such extensions to the sides, substantially as set forth.

2. In a folding crate, the combination of a permanent bottom, ends and sides; a divided hinged partition adapted to stand vertically and to be folded downwardly within the crate, folding sides hinged to the permanent sides provided with cleats adapted to engage the partition, beveled at the inner lower ends, the permanent and folding sides being beveled at their meeting edges to permit the hinged sides to be extended outwardly for passage of the partition, folding ends hinged to the permanent ends adapted to be turned inwardly, and supplemental folding extensions hinged to the folding ends with beveled meeting faces, adapted to extend horizontally inward between the sides when the crate is erected, and means for securing such extensions to the sides, and a top provided with means for securing it to the ends when the crate is either erected or collapsed, substantially as set forth.

In testimony whereof I have hereunto set my hand this 4th day of March, 1897.

JOHN CUNNINGHAM.

Witnesses:
GEO. B. PARKER,
C. M. CLARKE.